Dec. 27, 1966 E. C. BECKMAN ET AL 3,294,443

SEAT BACK LATCH

Filed March 22, 1965

Inventors
Ernest C. Beckman
Bernard O. Anderson
By
McCanna, Morsbach & Pillote
Attorneys United States Patent Office 3,294,443
Patented Dec. 27, 1966

3,294,443
SEAT BACK LATCH
Ernest C. Beckman and Benard O. Anderson, Rockford, Ill., assignors to Modern Metal Products Co., Loves Park, Ill., a corporation of Illinois
Filed Mar. 22, 1965, Ser. No. 441,662
9 Claims. (Cl. 297—369)

This invention relates generally to a latch mechanism for latching two members movable relative to each other and more particularly to a latch mechanism adaptable for latching a movable seat back to a vehicle body such as in a station wagon.

It is an object of this invention to provide a novel latch mechanism which has few parts which are easy to manufacture and may readily be assembled, and thus is low in cost.

It is another object of this invention to provide a novel latch mechanism which is easy to operate and which requires little maintenance.

It is yet another object of this invention to provide a unique mechanism having a latch bolt which is automatically slidable to a latched position when the members desired to be latched together are moved into juxtaposition.

Still another object of this invention is to provide a latch mechanism having a slidable latch bolt which will automatically be retained in a retracted position when retracted from the latched position.

A further object of this invention is to provide a new latch mechanism and a retaining member for latching two members movable relative to each other wherein the latch mechanism is mounted on one of said members and the retaining member is mounted on the other of said members, said retaining member adapted for operably triggering the latch bolt whereby the members may be secured together.

Other objects and advantages of the invention will become apparent as the invention becomes better understood by reference to the following specification and drawings wherein.

The latch herein disclosed is comprised of two major parts, a latch mechanism and a receiver member. The latch mechanism is adapted for mounting on a first unit, such as a pivotal seat back and comprises a base plate, a casing which together with the base plate forms a housing, a latch bolt slidably mounted in the housing, and a spring disposed inside the housing. The receiving member is adapted for mounting on a second unit, such as a wheel housing, and is operable to automatically trigger and retain the latch mechanism to secure the units together.

Figure 1:
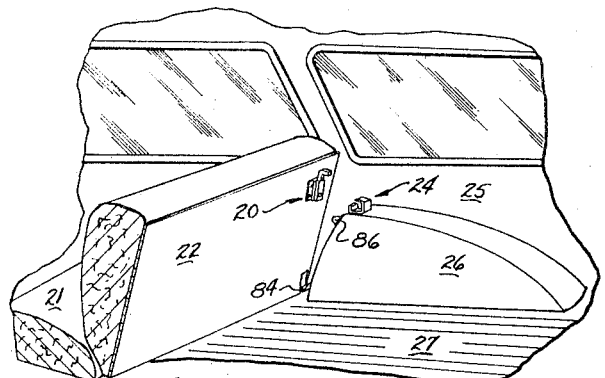
FIGURE 1 is a perspective view illustrating a car seat back pivoted slightly forward of its normal seating position with the latch mechanism mounted on the rear of the seat back and the retaining member mounted on the wheel housing of the car body.
Figure 4:
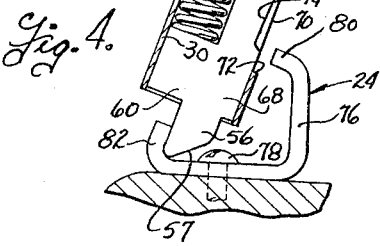
FIG. 4 is a sectional view through the latch housing along line 4—4 of FIG. 3 to better illustrate the relationship of parts and showing the latch bolt in its extended or latched position engaged with a keeper.

Reference may now be had to the drawings wherein FIG. 1 illustrates a body 25 of a vehicle or station wagon which body includes a wheel housing 26 and a rear floor or deck 27. Disposed within the body 25 is a seat 21 having a tiltable seat back 22. A latch mechanism, generally indicated by the numeral 20, is mounted on the rear of the seat back 22 and a receiving member generally designated by the numeral 24 is mounted on the wheel housing 26. Another latch mechanism is normally mounted on the other side of seat back 22 and another receiving member is normally mounted on the other wheel housing (not illustrated). Latch mechanism 20 includes a base plate generally designated by the numeral 30, a casing generally designated by the numeral 28, a latch bolt generally designated by the numeral 32, and a spring 34. Base plate 30 and casing 28 are fastened together by means of fasteners 36 to provide an enclosure which is hereinafter sometimes referred to as a housing. Latch bolt 32 is disposed inside the housing and is operably slidable between a retracted position, best illustrated in FIG. 5, and a latched position to engage receiving member 24, as best illustrated in FIG. 4. Spring 34 is arranged to maintain latch bolt 32 in its operable positions which will be described infra. Spring 34 may be of any convenient kind but is preferably a helical-type spring.

Figure 2:
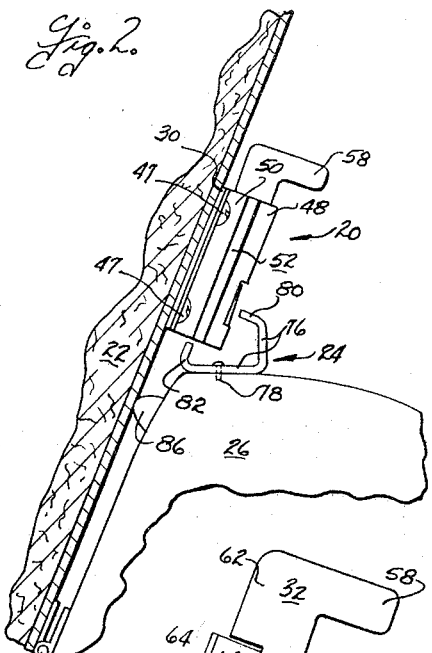
FIG. 2 is a side view of the arrangement of FIG. 1 with the latch mechanism approaching a position to contact the retaining member mounted on the wheel housing.
Figure 3:
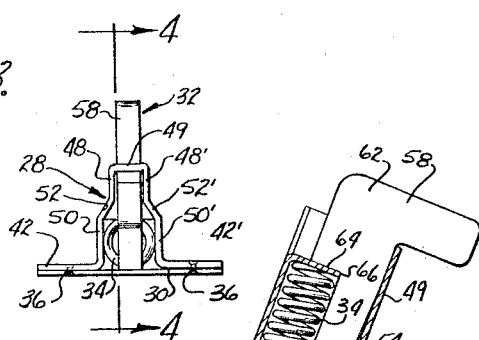
FIG. 3 is a front view of the latch mechanism.
Figure 6:
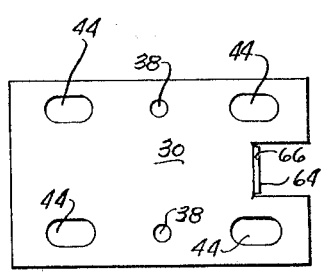
FIG. 6 is a top view of the housing base plate.
Figure 7:
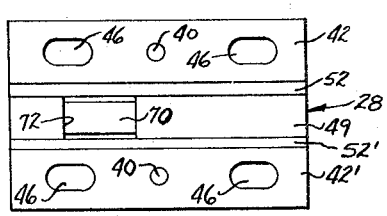
FIG. 7 is a top view of the casing portion of the housing.

Casing 28 is generally channel-shaped, as best seen in FIG. 3, and comprises a web 49 with generally parallel upper flange portions 48 and 48' extending perpendicularly therefrom. Parallel lower flange portions 50 and 50' are stepped outwardly from the upper flange portions 48 and 48' respectively and are connected thereto by intermediate flange portions 52 and 52' respectively. Wing flanges 42 and 42' extend outwardly and perpendicularly from portions 50 and 50' respectively. A plurality of holes 40 and 46 are arranged in the wing flanges as best seen in FIG. 7 for respectively overlying holes 38 and 44 in base plate 30 (FIG. 6). Holes 38 and 40 receive rivets or other fasteners 36 during assembly to fasten casing 28 and base plate 30 together. When assembled, holes 44 and 46 are in general registry to receive fasteners 47 for mounting on a seat back as shown in FIG. 2. Holes 44 and 46 are conveniently elongated to afford adjustment of the latch mechanism 20 when mounted on the seat back 22 to allow positioning of the latch mechanism with respect to receiving member 24.

Figure 5:
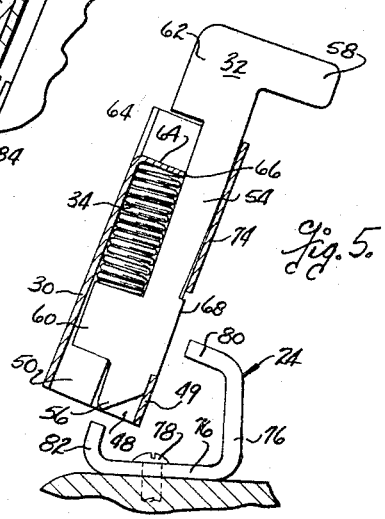
FIG. 5 is a sectional view through the latch housing generally along the same line as FIG. 4 but showing the latch bolt in its retracted or unlatched position.

Latch bolt 32 is slidable in the housing formed by casing 28 and base plate 30. The latch bolt comprises an elongate body 54 slidable between the parallel upper flange portions 48 and 48' as best shown in FIG. 3. A projectible nose portion 56 is generally disposed within the housing when the latch mechanism is in its retracted position as shown in FIG. 5. Nose portion 56 projects from the latch end of the housing when the mechanism is in its latched position (FIG. 4). Handle 58 is provided at the handle end of the housing for manually retracting the latch from the latched position to the retracted position. Leg 60 of the latch bolt is arranged adjacent the nose portion 56 and generally slides on the base plate 30 as the latch bolt moves in the housing. Stop portion 62 is disposed adjacent the handle 58 and generally opposite to leg 60. A recess is formed by the disposition of leg 60 and stop portion 62 for accommodation of spring 34. The recess has a substantially smooth surface 61 which is slidable across upper surface 66 of pivot 64 on base plate 30. Pivot 64 is conveniently formed by bending a portion of base plate 30 to a position extending generally perpendicularly from the base plate 30 adjacent the handle end thereof. When casing 28 and base plate 30 are fastened together as aforedescribed, pivot 64 extends upwardly toward the under surface of web 49. As described above, surface 61 is slidable on upper edge 66 and, when the latch bolt is retracted to the position shown in FIG. 5, the latch bolt is tiltable on upper edge 66 to engage catch 68 with the housing in a manner to be hereinafter described.

Referring now to FIG. 7, casing 28 has an aperture 70 formed by a rectangular like cutout in web 49 and the aperture preferably extends for a short distance into parallel upper flange portions 48 and 48'. The aperture describes a catch-retaining edge or shoulder 72 adjacent the latch end of the casing. The catch-retaining shoulder serves as a stop to engage catch 68 as the latch bolt is tilted to the position shown in FIG. 5. The aperture conveniently has a length sufficient to accommodate catch 68. The upper surface of elongate body 54 is slanted downwardly to the rear side of catch 68 to form an inclined surface 74 to facilitate the tilting action of the latch bolt and bring catch 68 into engagement with catch-retaining shoulder 72.

Latch mechanism 20 is operable in its latched position, wherein nose portion 56 extends or projects, to engage receiving member 24. This position is achieved as helical spring 34, compressibly arranged between pivot flange 64 and leg 60, biases the latch to the latch position shown in FIG. 4. To disengage nose portion 56 from receiving member 24, handle 58 is pulled generally to the position illustrated in FIG. 5. As the handle is pulled, leg 60 slides on base plate 30 and elongate body 54 moves between the under surface of web 49 and upper edge 66 of pivot 64. When the latch reaches the position in FIG. 5, the force applied on the handle 58 and the force applied by spring 34 on leg 60 provides a couple whereby latch bolt 32 tends to pivot around pivot 64. When the latch bolt reaches the position shown in FIG. 5, the aperture allows this pivoting tendency to be consummated whereby catch 68 will move into aperture 70. As the force on handle 58 is released, the catch 68 engages catch-retaining shoulder 72 and spring 34, pressing against the leg 60, holds the catch against the catch-retaining shoulder 72. As a result, nose portion 56 is retracted generally inside the housing, and the latch bolt is held in retracted position.

Latch mechanism 20 of the instant invention requires few parts for fabrication and its structure is sturdy. With the exception of the spring and fasteners, all parts are preferably metal stampings. One spring maintains the latch bolt in its unlatched position and also maintains the latch bolt in its latched position. Channel-shaped casing 28 is configurated to form intermediate flange portions 52 and 52' which operate to stiffen the casing 28. Additionally, since lower flange portions are spaced a greater distance from each other than the upper flange portions, they operate to provide space for a relatively large and strong spring 34.

Latch mechanism 20 may be manually operated to disengage catch 68 from catch retaining shoulder 72 by manually pushing the catch from the catch retaining shoulder or by moving handle 58 to pivot the latch bolt and effectuate the disengagement. Moreover, should the latch bolt be disengaged as by accident, and be in extended position (FIG. 4) as the latch mechanism approaches the retaining member, means is provided to allow latching. Nose portion 56 has a slanted face 57 which will contact keeper 82 and can latch bolt 32 enough to allow the latch bolt to ride over the keeper. However, FIGS. 1, 2 and 5 illustrate a particularly advantageous means of automatically operating the mechanism. Seat back 22 as shown in FIG. 2 is about to assume its normal seat position. To secure the seat back in its normal seat position, latch mechanism 20 and receiving member 24 are mounted on the rear of the seat back 22 and the wheel housing 26 respectively. Receiving member 24 comprises a generally L-shaped portion 76, contact portion 80 and keeper portion 82. Receiving member 24 is secured to the wheel housing with fasteners 78 through one of the legs of portion 76. Trigger portion 80 and keeper portion 82 extend angularly from the ends of the legs of L-shaped portion 76 and inwardly generally toward each other. As seat back 22 is pivoted on hinge 84 and is moved into juxtaposition to wheel housing 26, the seat back will engage resilient stop 86. The resilient stop 86 is depressible so that contact portion 80 can contact the catch 68 through aperture 70 thereby operating as a trigger to disengage the catch from catch-retaining shoulder 72. At this point, spring 34 will operate to quickly move the latch bolt to its latch position whereby nose portion 56 is projected from the housing. When the nose portion assumes this projected position, keeper portion 82 is disposed between the seat back and the nose portion and resilient means 86 operates to urge the nose portion against the keeper portion. The resilient stop operates to generally prevent rattling of the metal against the metal contact. It can be readily seen that, when operated in the above manner, the catch 68 of the latch bolt 32 is automatically disengaged by the contact portion 80 of receiving member 24. When it is desired to disengage the latch mechanism in order to pivot the seat back, handle 58 may be readily pulled to retract the nose portion and allow the seat back to move away from the stop 86.

As best illustrated in FIG. 5, the exposed catch 68 is substantially longer than the contact portion 80 on the receiving member. In addition, contact portion 80 has a width generally wider than the width of catch 68, as shown in FIG. 1. As described above, contact between the contact portion 80 and catch 68 will operate to automatically release the latch bolt from retracted position. Because of the wide area where the latch mechanism will be automatically triggered, there is considerable allowance in mounting the parts on swingable members movable relative to each other such as a seat back and vehicle body or wheel housing. As a result, the components of this invention provide an exceptional ease in mounting, and the latch mechanism and receiving member are so designed that variation in relative position is not unsightly and hardly noticeable.

While we have thus described a specific embodiment of this invention, it should be understood that it has been done by way of illustration and not limitation and we do not wish to be limited except as required by the appended claims.

We claim:

1. A latching device especially adapted for latching a seat back to a vehicle body and comprising keeper means adapted to be secured to one of two members movable relative to each other and a latch mechanism having a latch end and a handle end generally opposite the latch end and adapted to be secured to a second of said members and including a housing having a base shaped for lying generally contiguous to said second member, generally opposite openings adjacent the latch end and handle end of the latch mechanism, an aperture defining a catch-retaining shoulder in the side opposite said base and adjacent the latch end, and a pivot disposed inside the housing adjacent the handle end, a latch bolt slidably mounted in the housing and having a nose portion projectible from the housing to a latched position for engaging the keeper, handle means for retracting the latch bolt from the latched position to a retracted position, a catch portion extending substantially upright from the side adjacent the aperture for engaging with the catch-retaining shoulder when the latch bolt is in retracted position, a portion cut away adjacent the base for forming a surface slidable on the pivot and a spring engaging edge adjacent the latch end, and a stop means adjacent the handle end for engaging the housing when the latch bolt is in extended position thereby stopping projection of the latch bolt, and spring means disposed adjacent the base and interposed between the pivot means and the spring-engaging edge for projecting the nose portion from the housing when the catch portion is disengaged from the catch-retaining shoulder, and so constructed and arranged that force applied to the handle to retract the latch bolt provides a couple with the force applied by the spring means whereby the latch bolt when retracted pivots on the pivot to force the catch portion into the aperture to engage the catch-retaining shoulder.

2. A latching device especially adapted for latching a seat back to a vehicle body and comprising a keeper adapted to be mounted on one of two members movable relative to each other and a latch mechanism having a latch end and a handle end and adapted to be mounted on a second of said members and including a substantially rectangular base plate shaped to lay generally contiguous to said second member and having a pivot portion located adjacent said handle end and extending in a direction substantially outwardly from the second member, a casing attached to the base plate and generally overlying the same and having a central portion disposed away from the base plate to provide a longitudinal housing with the base plate, said housing having generally opposite openings adjacent the latch end and handle end of the latch mechanism, and the casing having an aperture in the central portion adjacent the latch end defining a catch-retaining shoulder, a latch bolt slidably mounted in the housing and including, a nose portion projectible from the housing to a latched position for engaging the keeper, a handle portion extending out of the housing from said handle end and substantially laterally from the housing for manually retracting said latch bolt from the latched position to a retracted position whereby the nose portion is substantially disposed inside the housing, a catch portion extending generally upright from the side adjacent said aperture for engaging said catch-retaining shoulder when the latch bolt is in retracted position, and a portion cut away adjacent the base plate for forming a substantially smooth surface slidable across the pivot portion, a spring engaging edge adjacent the latch end, and a stop edge adjacent said handle end for engaging the pivot portion when the latch bolt is in extending position thereby limiting the movement of the latch bolt, and spring means adjacent the base plate, and interposed between the pivot portion and the spring-engaging edge for projecting the nose portion from the housing when the catch portion is disengaged from the catch-retaining shoulder, and so constructed and arranged that manual force applied to the handle to retract the latch bolt provides a couple with the force applied by the spring whereby the latch bolt when in retracted position pivots on the pivot portion and the catch portion is forced into the aperture to engage the catch-retaining shoulder.

3. The combination of claim 2 including contact means on said one member for contacting the catch portion through the aperture to disengage the latch means whereby the nose portion is projected from the housing to engage the keeper and latch the two members.

4. A latching device especially adapted for latching a seat back to a vehicle body and comprising, (a) a latch mechanism having a latch end and a handle end generally opposite the latch end and adapted to be secured to one of two members movable relative to each other and including a housing portion having generally opposite openings adjacent the latch end and handle end of the latch mechanism, an aperture in the housing defining a catch-retaining shoulder, a pivot disposed within said housing, a latch bolt slidably mounted in the housing and having a nose portion projectible from the latch end of said housing to a latched position, handle means on said latch bolt extending outside the housing at the handle end for retracting said latch bolt from the latched position to a retracted position, a catch means adapted to register in the aperture for engaging with the catch-retaining shoulder when the latch bolt is in the retracted position thereby holding the latch bolt in said retracted position, said latch bolt disposed on the pivot and pivotally tiltable to engage the catch means with the catch-retaining shoulder, and spring means compressibly disposed between said pivot and said latch bolt at the side of said housing opposite said aperture for holding the catch means against the catch-retaining shoulder in retracted position and for projecting the nose portion from the housing when the catch portion is disengaged from the catch retaining shoulder and so constructed and arranged that force applied to the handle means to retract the latch bolt provides a couple with the force applied by the spring whereby the latch bolt when retracted pivots on the pivot to force the catch means into the aperture to engage the catch-retaining shoulder, (b) and a receiving member mounted on a second of said members and having contact means for contacting the latch bolt as the seat back is moved into latched position for disengaging the catch means from the catch-retaining shoulder whereby the nose portion is projected from the housing and keeper means for engaging the nose portion when in projected position thereby latching and retaining the seat back in position.

5. A latching device especially adapted for latching a seat back to a vehicle body and comprising, a latch mechanism having a latch end and a handle end and adapted to be mounted on one of two members movable relative to each other and including a substantially rectangular base plate shaped to lay generally contigous to said one member, said base plate having a pivot portion located adjacent said handle end and extending in a direction substantially outwardly from said one member, a casing attached to the base plate and generally overlying the same and having a central portion away from the base plate to provide a longitudinal housing, said housing describing generally opposite openings adjacent the latch end and handle end of the latch mechanism, said casing having an aperture defining a catch-retaining shoulder in the central portion adjacent the latch end, a latch bolt slidably mounted in the housing and including a nose portion projectible from the housing to a latched position, said latch bolt having a handle portion extending out of the housing from said handle end opening and substantially laterally from the housing in a direction away from the base plate for manually retracting said latch bolt from the latched position to a retracted position whereby the nose portion is substantially disposed inside the housing, a catch portion generally protruding from the latch bolt on the side adjacent said aperture for engaging said catch-retaining shoulder when the latch bolt is in retracted position, said latch bolt having a portion cut away adjacent the base plate for forming a substantially smooth surface slidable across the pivot portion and a spring-engaging edge adjacent the latch end, stop means for stopping movement of said latch bolt at said latched position when moving from said retracted position to said latched position, a spring adjacent the base plate and interposed between the pivot and the spring engaging edge of the latch bolt for projecting a nose portion from the housing when the catch portion is disengaged from the catch-retaining shoulder; and a receiving member mounted on a second of said members and including contact means for contacting the catch portion through the aperture for disengaging the catch portion the catch-retaining shoulder whereby the nose portion is projected from the housing, the keeper means for engaging the nose portion when in projected position.

6. The combination of claim 5 including a resilient means mounted on one of the units of the group comprising said one member and said second member for engaging the other unit as they are pivotally moved into juxtaposition, said resilient means depressible for allowing said contact means to contact the catch portion and disengage the same from the catch-retaining shoulder, and said resilient means operable for resiliently pressing said nose portion when in latched position against said keeper means thereby substantially eliminating any rattling between the same.

7. A latching device especially adapted for latching a seat back to a vehicle body and comprising a latch mechanism having a latch end and a handle end and adapted to be mounted on one of two members movable relative to each other and including a substantially rectangular base plate consisting of a metal stamping shaped to lay generally contiguous to said one member, said base plate having a portion adjacent said handle end bent in a direction outwardly from said one member to form a pivot, a casing consisting of a metal stamping generally overlying said base plate, means attaching said casing to said base plate, said casing having a central portion disposed away from the base plate to provide a longitudinal housing describing generally opposite openings adjacent the latch end and handle end of the latch mechanism, said casing having an aperture defining a catch-retaining shoulder in the central portion adjacent the latch end, a latch bolt consisting of a metal stamping slidably mounted in the housing for movement between a latched position and a retracted position, said latch bolt including a nose portion projectible from the housing and a handle portion extending out of the housing from said handle end opening for manually retracting said latch bolt to a retracted position whereby the nose portion is disposed inside the housing, said latch bolt having a protruding catch on the side adjacent said aperture for engaging said catch-retaining shoulder when the latch bolt is in retracted position, said latch bolt having a portion adjacent the base plate cut away for forming a substantially smooth surface slidable across the pivot and a spring-engaging edge adjacent the latch end, stop means on the latch bolt for engaging one of the group comprising said base plate and said casing for stopping movement of said latch bolt at latched position, a spring adjacent the base plate and interposed between the pivot and the spring-engaging edge of the latch bolt for projecting the nose portion from the housing when the catch portion is disengaged from the catch-retaining shoulder, and a receiving member mounted on a second of said members and comprising a metal stamping, said receiving member including contact means for contacting the catch portion through the aperture for disengaging the same and whereby the nose portion is projected from the housing, said receiving member having keeper means for engaging the nose portion when in projected position to retain the two members in latched relationship.

8. A latching device especially adapted for latching a seat back to a vehicle body and comprising a latch mechanism having a latch end and a handle end and adapted to be mounted on one of two members movable relative to each other and including a substantially rectangular base plate shaped to lay generally contiguous to said one member, said base plate having a portion adjacent said handle end bent at approximately right angles to said base plate in a direction away from said one member for forming a pivot, a casing generally overlying said base plate and having side portions contiguous to the base plate and central portion spaced therefrom to form a longitudinal housing, said base plate and said side portions having a generally concentric hole adjacent each side thereof, a fastener in each of said holes for securing the base plate and casing together, said base plate and said housing having a plurality of generally concentric enlongated holes for receiving fasteners for mounting the latch mechanism on said one member, said central portion of the casing including a central web spaced from and generally parallel to said base plate and a pair of upper flange portions attached at either side of said web and extending generally perpendicular therefrom in a direction toward said base plate, said web having an aperture therein defining a catch-retaining shoulder adjacent the latch end, said central portion also including a pair of lower flange portions each attached to a respective side portion and extending generally perpendicularly therefrom in a direction away from said base plate and spaced from each other a distance greater than the spacing of said upper flange portions, said central portion having a pair of intermediate flange portions each connecting a respective upper and lower flange portion, an enlongated latch bolt slidably mounted in the housing for movement between a latched position and a retracted position and including a nose portion adjacent said web and projectible from the housing, said nose portion having an inclined edge adjacent said web for engaging and sliding over a keeper and having a generally flat edge spaced from the web for engaging a keeper to latch said members, said latch bolt including a handle portion extending out of the housing from said handle end opening and laterally from said housing in a direction away from said base plate, said latch bolt having a protruding catch on the side adjacent said web for engaging the catch-retaining shoulder when the latch bolt is in retracted position, said latch bolt having a portion adjacent the base plate cut away for forming a substantially smooth surface slidable across the pivot and a spring-engaging edge adjacent the latch end, stop means on the latch bolt for engaging one of the group consisting of said base plate and said casing for stopping movement of said latch bolt at latched position, a helical spring disposed adjacent the base plate and interposed between the pivot and the spring-engaging edge of the latch bolt for projecting the nose portion from the housing when the catch portion is disengaged from the catch-retaining shoulder, and keeper means mounted on a second of said members for engaging said nose portion and retaining the two members in latched relationship.

9. A latching device especially adapted for latching a seat back to a vehicle body and comprising a latch mechanism having latch handle ends and including a substantially rectangular base plate consisting of a metal stamping adapted to be mounted on one of two members movable relative to each other, said base plate having a portion adjacent said handle end bent at approximately right angles to said base plate in a direction away from one member for forming a pivot, a casing consisting of a metal stamping generally overlying said base plate and having side portions attached thereto and a central portion spaced therefrom to form a longitudinal housing, said base plate and said side portions having a plurality of generally concentric enlongated holes for receiving a plurality of mounting fasteners, said central portion of the casing including a central web spaced from and generally parallel to said base plate and having an aperture therein defining a catch-retaining shoulder adjacent the latch end, said central portion also including a pair of upper flange portions attached at either side of said web and extending generally perpendicularly therefrom toward said base plate and a pair of lower flange portions each attached to a respective side portion and extending therefrom in a direction away from said base plate and spaced from each other a distance greater than the spacing of said upper flange portions, a pair of intermediate flange portions each connecting a respective upper and lower flange portion, an enlongated latch bolt consisting of a metal stamping slidably mounted in the housing and including a nose portion projectible from the housing to a latched position, said nose portion having an inclined edge adjacent said web for camming the latch bolt over a keeper and having a generally flat edge opposite said inclined edge for engaging the keeper, a handle portion on the latch bolt extending from said handle end and away from said base plate for manually retracting said latch bolt to a retracted position, said latch bolt having a protruding catch adjacent said web for engaging the catch-retaining shoulder when the latch bolt is in retracted position, said latch bolt having a portion adjacent the base plate cut away for forming a substantially smooth surface slidable across the pivot and a spring-engaging edge adjacent the latch end, stop means on the latch bolt for engaging one of the group consisting of said base and said casing, a helical spring interposed between the pivot and the spring-engaging edge of the latch bolt for projecting the nose portion from the housing when the catch portion is disengaged from the catch-retaining shoulder, and a receiving member comprising a metal stamping mounted on a second of said members, said receiving member including a generally L-shaped body, an upstanding keeper attached adjacent the end of one leg of said L-shaped body for engaging said nose portion when in latched position, and a contact arm attached adjacent the end of the other leg of said L-shaped body and extending toward said latch mechanism for contacting and disengaging the catch portion through the aperture as the latch mechanism is moved into latch position.

References Cited by the Examiner

UNITED STATES PATENTS

| | | | |
|---|---|---|---|
| 2,760,813 | 8/1956 | Colm | 296—65 |
| 2,815,796 | 12/1957 | Lobanoff | 296—68 |
| 2,896,999 | 7/1959 | Liubauskas | 296—65 |
| 3,015,520 | 1/1962 | Johnson | 297—371 |
| 3,028,198 | 4/1962 | Murr | 297—216 |

FRANK B. SHERRY, *Primary Examiner.*

G. O. FINCH, *Assistant Examiner.*